H. H. BURRITT.
Improvement in Curtain-Fixtures.
No. 131,496. Patented Sep. 24, 1872.
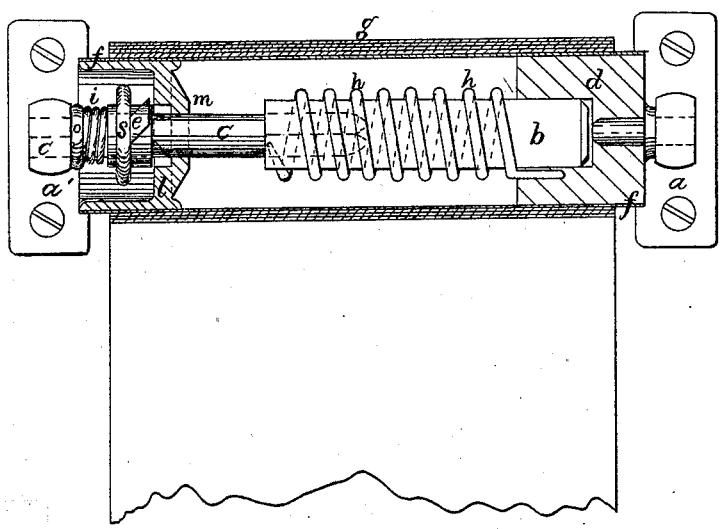
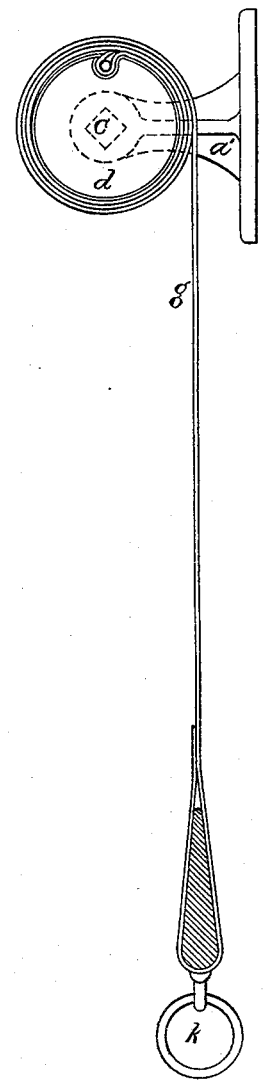
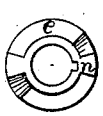 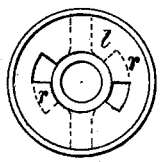 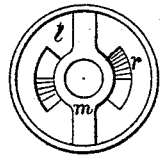
Witnesses.
Thos. S. Crane
Fk K. Day
Inventor.
H. H. Burritt

UNITED STATES PATENT OFFICE.

HARVEY H. BURRITT, OF NEWARK, NEW JERSEY, ASSIGNOR TO WILLIAM A. COOK, OF SAME PLACE.

IMPROVEMENT IN CURTAIN-FIXTURES.

Specification forming part of Letters Patent No. 131,496, dated September 24, 1872.

*To all whom it may concern:*

Be it known that I, HARVEY H. BURRITT, of Newark, Essex county, New Jersey, have invented an Improvement in Shade-Fixtures for Automatically Winding up Window or other Shades; and I do declare that the following is a full and exact description of the same, reference being had to the accompanying drawing, in which—

Figure 1 is an elevation of the shade-roller, with its exterior shell or tin envelope removed so as to show the internal arrangements, a part of which, $l$ and $d$, are in section. Fig. 2 is an end elevation of the same, showing the roller in its bracket $a'$, and the wire $w$ for securing the muslin or linen shade into the roller. Fig. 3 is an end view of the screw-thread $e$, constructed with slot $n$ to fit pin in spindle $c$; and Figs. 4 and 5 are front and rear elevations or views of head $l$ as viewed from the end of the roller $f$.

My shade-roller is provided with a spiral spring, $h$, fastened at one end to the wooden head or plug $d$, which is fastened to one end of the tin envelope or cover of the roller. At the other end, the spring $h$ is fastened to a stationary spindle, $b$, which is prevented from turning when the shade is rolled or unrolled by its union with the spindle $c$, which is of iron, and has a square formed on it to fit the bracket $a'$. The object of the appliances $i$, $e$, and $l$ is to form a clutch for securing the shade and roller in any desired position, and to obviate the tendency of the pawl and ratchet (commonly employed with automatic shade-rollers) to fall out of place and release the spring (from tension) when the roller is detached from its brackets, and is subjected to shocks or any careless handling.

Upon examination it will be seen that the clutch employed in my invention cannot become detached without unwinding the shade somewhat, or turning the roller around on the spindle $c$, while the ordinary pawl is held in a shallow notch, at first, by gravity, and easily detached from its place in the ratchet. The clutch mentioned is formed as follows: A metallic head, $l$, is fastened into one end of the tin roller $f$. This head has a bearing, $m$, at its back side to run upon the spindle $c$, and its front side is formed with a hole larger than the spindle, in which hole a screw-thread is formed, $r$. For convenience of casting this head of iron the screw-thread $r$ is cut all the way through the head $l$, and forms an opening on the back of the head on each side of the bearing $m$. Upon the spindle $c$ is placed a short piece of screw-thread, $e$, which is constantly pressed against the nut $r$ in the head $l$ by the spring $i$, which bears at one end against a collar, $o$, formed on spindle $c$. The thread $e$ is kept from turning on $c$ by a pin in the spindle $c$, which fits the slot $n$ in the thread $e$.

It is evident that if the roller and head $l$ containing thread $r$, are turned in one direction the screw $e$ will enter the thread $r$ until checked by the flange $s$ at its back, when it will prevent any further motion of the roller. If the spring $h$ and screw $e$ are placed in the relation shown in the drawing then any tendency of the spring $h$ to wind or roll up the shade $g$ will be prevented by the clutch described, formed of the thread $r$ in the head $l$, and screw $e$ on spindle $c$. If, however, it is desired to have the shade entirely rolled up, or rolled to any convenient point, the operator pulls the shade down far enough to unscrew the thread $e$ from its place in the thread $r$, and then a sudden motion of the shade upward will cause the thread $r$ to revolve so rapidly that thread $e$ cannot engage with it, and the rotation of the roller will continue without any check from the clutch at all. To retain the shade at any desired point, it is simply needful to check the speed of the ascending shade at that point, when the clutch will engage and the roller be held as desired.

It is evident that this clutch being entirely within the roller, it may be removed from its brackets without releasing the spring from tension, and the clutch being formed of a male and female thread deeply interlocked, there can be no risk of accidental displacement, as there is of a pawl falling out of a ratchet.

Having thus described the mode of constructing my invention, what I claim and desire to secure by Letters Patent, is—

Claim.

The spiral clutch, arranged as described, consisting of the head $l$, sleeve and screw thread $e$, and spring $i$, when used in combination with a spring shade-roller, as specified.

H. H. BURRITT.

Witnesses:
THOS. T. CRANE,
FREDK. K. DAY.